(12) United States Patent
Terada et al.

(10) Patent No.: US 6,758,037 B2
(45) Date of Patent: Jul. 6, 2004

(54) EXHAUST EMISSION CONTROL DEVICE OF ENGINE

(75) Inventors: Mikio Terada, Moriyama (JP); Kazuya Oohashi, Ootu (JP); Hiroki Taniguchi, Shizyounawate (JP); Kiyoshi Hatano, Kyoto (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/235,497

(22) Filed: Sep. 6, 2002

(65) Prior Publication Data

US 2003/0046929 A1 Mar. 13, 2003

(30) Foreign Application Priority Data

Sep. 7, 2001 (JP) ......................................... 2001-272260
Sep. 7, 2001 (JP) ......................................... 2001-272261

(51) Int. Cl.[7] ............................................... F01N 3/00
(52) U.S. Cl. .............................. 60/295; 60/278; 60/285; 60/284; 60/311; 60/300
(58) Field of Search ........................... 60/278, 284, 285, 60/295, 311, 297, 300

(56) References Cited

U.S. PATENT DOCUMENTS

| 4,535,588 | A | * | 8/1985 | Sato et al. ..................... 60/286 |
| 4,709,547 | A | * | 12/1987 | Pischinger et al. ........... 60/274 |
| 4,835,964 | A | * | 6/1989 | Kume et al. .................... 60/285 |
| 5,711,149 | A | * | 1/1998 | Araki ............................ 60/278 |
| 5,746,989 | A | * | 5/1998 | Murachi et al. ........ 423/213.7 |
| 6,293,096 | B1 | * | 9/2001 | Khair et al. ................... 60/286 |
| 6,304,815 | B1 | * | 10/2001 | Moraal et al. ............... 701/115 |
| 6,405,528 | B1 | * | 6/2002 | Christen et al. ............... 60/295 |
| 6,427,436 | B1 | * | 8/2002 | Allansson et al. ............. 60/274 |
| 6,438,948 | B2 | * | 8/2002 | Ono et al. ..................... 60/311 |
| 6,490,857 | B2 | * | 12/2002 | Sasaki .......................... 60/278 |
| 6,543,420 | B2 | * | 4/2003 | Kohketsu et al. ........... 123/447 |
| 6,546,721 | B2 | * | 4/2003 | Hirota et al. ................. 60/297 |
| 6,598,387 | B2 | * | 7/2003 | Carberry et al. .............. 60/297 |

FOREIGN PATENT DOCUMENTS

| DE | 199 57 715 A1 | 6/2000 |
| DE | 199 26 138 A1 | 12/2000 |
| DE | 199 52 830 A1 | 5/2001 |
| EP | 1 234 959 A2 | 2/2002 |
| FR | 2 804 170 A | 1/2000 |
| JP | 7-259533 | 10/1995 |

* cited by examiner

*Primary Examiner*—Thomas Denion
*Assistant Examiner*—Diem Tran
(74) *Attorney, Agent, or Firm*—Birch, Stewart, Kolasch & Birch, LLP (57) ABSTRACT

An exhaust emission control device comprises an oxidizing catalyst, a particulate filter on which soot is deposited, and a temperature sensor for detecting the temperature of exhaust gas on the upper-stream side of the filter. An intake system of an engine is provided with an EGR valve for returning the exhaust gas to the intake system. If the temperature of the oxidizing catalyst is found to be lower than its active temperature as the particulate filter is regenerated, the catalyst is heated by delaying the injection timing for the main fuel injection of the engine and increasing the EGR gas reflux quantity. Thus, the oxidizing catalyst can be heated up without lowering the fuel-efficiency, and soot on the particulate filter can be efficiently subjected to re-combustion.

8 Claims, 5 Drawing Sheets

EXHAUST EMISSION CONTROL DEVICE OF ENGINE

CROSS-REFERENCE TO RELATED APPLICATIONS

This application is based upon and claims the benefit of priority from the prior Japanese Patent Applications No. 2001-272260, filed Sep. 7, 2001; and No. 2001-272261, filed Sep. 7, 2001, the entire contents of both of which are incorporated herein by reference.

BACKGROUND OF THE INVENTION

1. Field of the Invention

The present invention relates to an exhaust emission control device for purifying exhaust gas from a diesel engine.

2. Description of the Related Art

A DPF (diesel particulate filter) of a continuous-regeneration type that uses an oxidizing catalyst and a particulate filter is known as a device for purifying exhaust gas of a diesel engine. In the purifying device of this type, NO in the exhaust gas is oxidized and changed into $NO_2$ with the oxidizing catalyst, so that soot (consisting mainly of carbon) in the particulate filter can be burned with $NO_2$ in a relatively low temperature range.

If excessive soot is deposited on the particulate filter of the continuous-regeneration DPF, the engine output lowers, and besides, the filter may possibly be melted down due to an extraordinarily high temperature as the soot is burned. Accordingly, the particulate filter must be heated up with use of some heat-up means to burn the deposited soot compulsively (for compulsive regeneration) in a timely manner. As is generally known, the compulsive regeneration is achieved by injecting a fuel (for so-called post-injection) in the expansion stroke of the engine.

Described in Jpn. Pat. Appln. KOKAI Publication No. 7-259533, moreover, is a technique such that an oxidizing catalyst carried on a particulate filter is heated up by increasing the injection quantity during the expansion or exhaust stroke of an engine when the catalyst is inactive (or cold).

This technique of using surplus fuel to heat up the oxidizing catalyst, however, has the problem of a low fuel-efficiency. When the engine is cold or in a low-load operation with the oxidizing catalyst at low temperature, moreover, the catalyst cannot cause the injected fuel easily to react, so that a satisfactory heat-up effect cannot be obtained.

The object of the present invention is to provide an exhaust emission control device, capable of effectively heating up an oxidizing catalyst and restraining the fuel-efficiency from lowering.

BRIEF SUMMARY OF THE INVENTION

In order to achieve the above object, an exhaust emission control device of an engine according to the present invention is configured to regenerate a particulate filter in a manner such that the injection timing for main injection of the fuel injection of the engine is delayed and/or the exhaust gas reflux quantity is increased if the temperature of an oxidizing catalyst in an engine passage on the upper-stream side of the particulate filter is not higher than a given value, and that a component to be oxidized by the catalyst is then supplied to the catalyst.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The following is a description of an embodiment of an exhaust emission control device of an engine according to the present invention.

Figure 1:
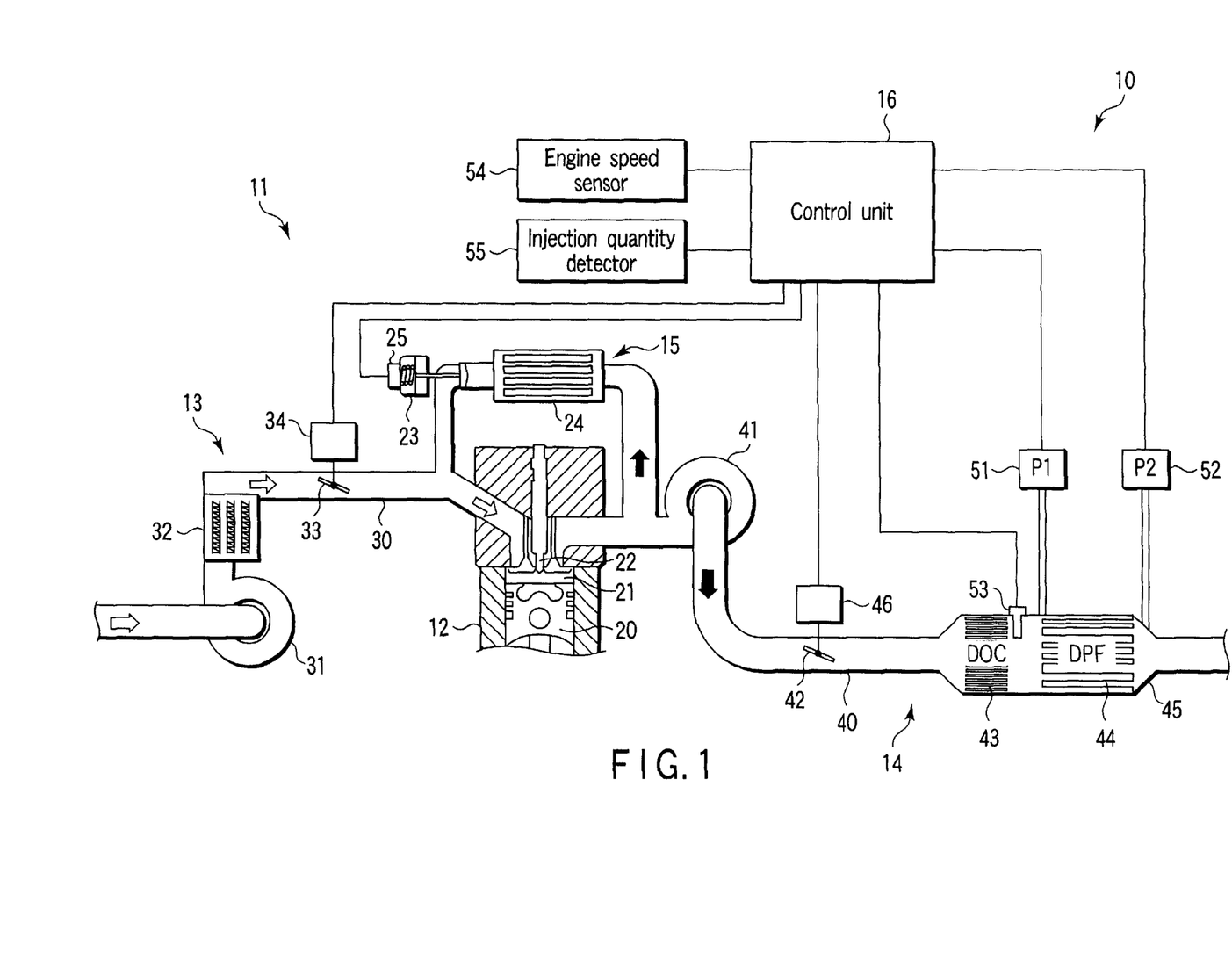
FIG. 1 is a schematic view of an engine furnished with an exhaust emission control device according to a first embodiment of the invention.

FIG. 1 schematically shows a diesel engine 11 that is furnished with an exhaust emission control device 10. The engine 11 comprises an engine body 12, intake system 13, exhaust system 14, EGR device 15, control unit 16 using a microcomputer and the like, etc.

The engine body 12 includes a piston 20, combustion chamber 21, fuel injection valve 22, etc. The EGR device 15 includes an EGR valve 23, EGR cooler 24, actuator 25, etc. The control unit 16 can control the actuator 25 accurately to change the opening of the EGR valve 23 with good response, and control the reflux quantity of exhaust gas that is returned to the intake system 13 of the engine 11.

The intake system 13 includes an intake pipe 30, compressor 31, intercooler 32, throttle 33, etc. The throttle 33 can change its opening by means of an actuator 34. The exhaust system 14 includes an exhaust pipe 40, turbine 41, shutter 42, oxidizing catalyst 43, particulate filter (hereinafter referred to as filter) 44, envelope 45, etc.

The envelope 45 contains the oxidizing catalyst 43 and the filter 44 therein. The exhaust pipe 40 and the envelope 45 function as an exhaust passage. The catalyst 43 is located on the upper-stream side of the filter 44 in the exhaust passage. The compressor 31 and the turbine 41 rotate integrally with each other. The shutter 42 can change its opening by means of an actuator 46.

First and second pressure sensor 51 and 52 are arranged on the upper- and lower-stream sides, respectively, of the filter 44, in order to detect the difference between the pressures of regions upstream and downstream of the filter 44. The sensors 51 and 52 constitute an example of differential pressure detecting means.

A temperature sensor 53 as an example of temperature detecting means according to this invention is located between the oxidizing catalyst 43 and the filter 44. The temperature sensor 53 has a function to detect the filter inlet temperature or the exhaust gas temperature of a region just on the upper-stream side of the filter 44. The sensor 53 constitutes exhaust gas temperature detecting means according to this invention, which can measure or estimate the exhaust gas temperature near the filter. The temperature of the filter 44 may be guessed from the result of measurement of the temperature sensor 53 and the like. Although catalyst temperature detecting means according to this invention may be configured directly to measure the temperature of the oxidizing catalyst 43, it is designed to estimate the temperature (inlet temperature) of the catalyst 43 in accordance with the result of measurement of the temperature sensor 53 and the like.

The control unit 16 is composed of electronic components, such as a microprocessor, having a computing function, and includes a memory that stores maps M1, M2, M3, and M4. The control unit 16 is connected with an engine speed sensor 54 as an example of operating state detecting means and an injection quantity detector 55. The operating state detecting means may include means for detecting the quantity of intake air and/or exhaust air-fuel ratio, besides the engine speed sensor 54.

The control unit 16 estimates the quantity of deposition (catch) of soot (particulates) captured by the filter 44. In order to estimate the quantity of deposition, the control unit 16 obtains a first estimated quantity of deposition from a prepared map (not shown) in accordance with a differential pressure detected by means of the pressure sensors 51 and 52, a detected temperature from the temperature sensor 53, and an engine speed detected by means of the engine speed sensor 54.

Further, the control unit 16 obtains a second estimated quantity of deposition (cumulative value after the end of the previous cycle of compulsive regeneration) from another prepared map (not shown) in accordance with the engine speed detected by means of the engine speed sensor 54 and a fuel injection quantity delivered from the injection quantity detector 55.

The control unit 16 has a function to control operation of the actuator 25 of the EGR valve 23 along with a function to control the injection quantity and injection timing of the injection valve 22. Thus, the control unit 16 serves both as EGR control means (exhaust gas reflux quantity control means) and as fuel injection control means (for controlling the fuel injection of the engine 11). The control unit 16 also serves as fuel injection control means to control main injection and post-injection.

The main injection described herein is normal fuel injection operation in which a fuel is injected during the compression stroke of the engine body 12 in accordance with the operating state of the engine 11. The post-injection is operation in which the fuel is injected into the combustion chamber 21 through the fuel injection valve 22 during the expansion or exhaust stroke of the engine body 12.

The following is a description of the operation of the exhaust emission control device 10.

When the engine 11 is operated, the filter 44 captures soot in the exhaust gas. Further, NO in the exhaust gas is oxidized and changed into $NO_2$ by means of the oxidizing catalyst 43. Continuous regeneration of the filter 44 is carried out as the $NO_2$ causes the soot in the filter 44 to burn in a relatively low temperature range (e.g., about 270° C. to 350° C.). Thus, if NO in the exhaust gas is supplied to the oxidizing catalyst, the NO (component) is oxidized into $NO_2$ by means of the catalyst. As the $NO_2$ (oxidant) is supplied to the filter 44, the soot deposited in the filter 44 is burned and removed, whereupon the filter 44 is regenerated.

The oxygen conversion factor of the oxidizing catalyst 43 has its maximum in a certain temperature range (e.g., active temperature range of 200° C. and above). If the exhaust gas temperature is within this temperature range, therefore, soot is burned with $NO_2$, so that continuous regeneration can be effected.

If the exhaust gas temperature is somewhat lower than the peak value of the active temperature, control (continuous regeneration support process) is carried out to raise the temperature of the oxidizing catalyst 43 to a value near the peak value, in order to enhance the conversion factor of the catalyst 43. The continuous regeneration support process is achieved by, for example, working the shutter 42 to some extent to increase the exhaust gas temperature.

Figure 2:
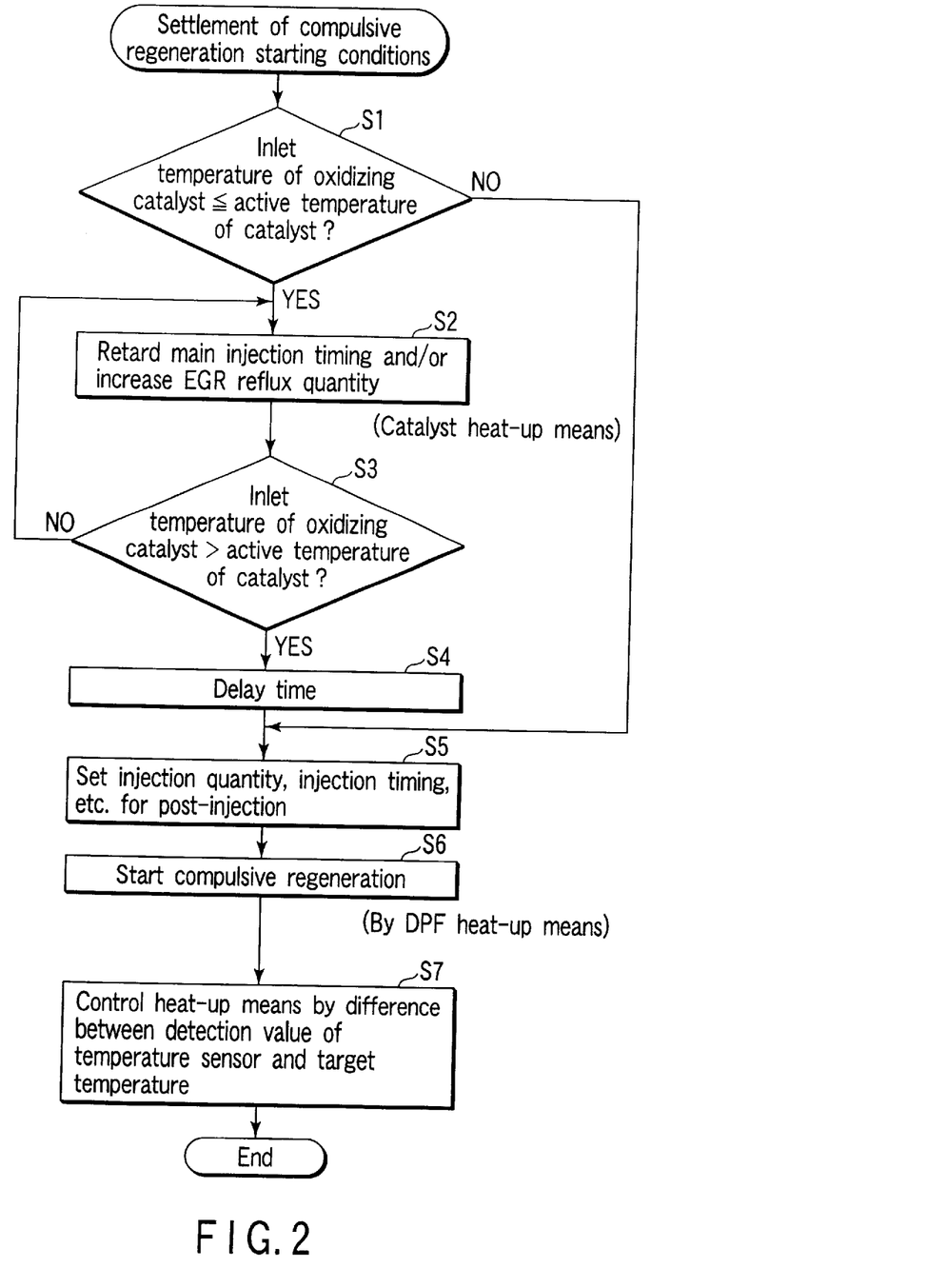
FIG. 2 is a flowchart showing the contents of processing of the exhaust emission control device according to the first embodiment.

If a given value (e.g., 25 g) is exceeded by the quantity of deposition of soot captured by the filter 44 (or if compulsive regeneration starting conditions are met), compulsive regeneration is started in accordance with the flowchart of FIG. 2. In the case of this embodiment, it is concluded that the compulsive regeneration conditions are met when the aforesaid given value is exceeded by the first and/or second estimated quantity of deposition, and the compulsive regeneration (regeneration process) is then started.

When the compulsive regeneration is carried out, whether or not the exhaust gas temperature detected by means of the temperature sensor 53 is not higher than the active temperature (e.g., 200° C.) of the catalyst 43 is determined in Step S1 of FIG. 2. If the exhaust gas temperature is not higher than the active temperature of the oxidizing catalyst 43, the program advances to a catalyst heat-up process of Step S2.

Figure 3:
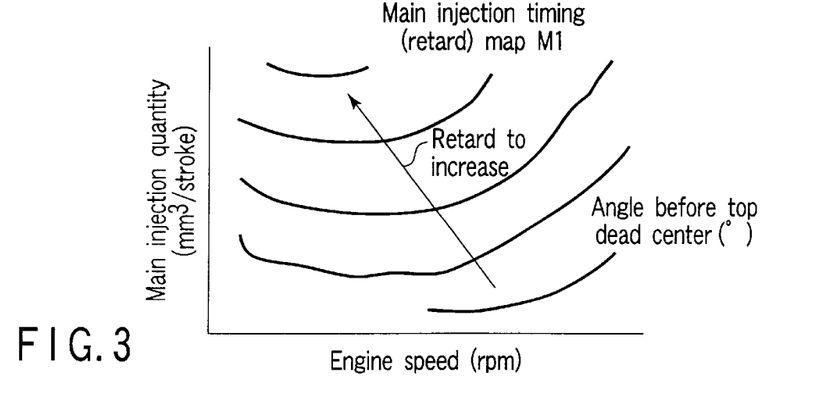
FIG. 3 is a diagram showing a map used to obtain the lag angle of the injection timing of the exhaust emission control device according to the first embodiment.

In Step S2, the catalyst is heated up by performing operation (retard control) for retarding the injection timing for the main injection and/or operation (EGR control) for increasing the opening of the EGR valve 23. By the retard control, the injection timing for the fuel injected by means of the fuel injection valve 22 at the end of the compression stroke of the piston 20 lags. The lag angle of the retard control is set according to the map M1 of FIG. 3 based on the engine speed and the engine load (main injection quantity). The lower the engine speed and the higher the engine load (or the greater the main injection quantity), for example, the greater the set value of the retard (lag angle) is. As the main injection timing is delayed, the peak of heat generated in cylinders is delayed, so that the exhaust gas temperature rises. The exhaust gas temperature rises correspondingly to the retard.

Figure 4:
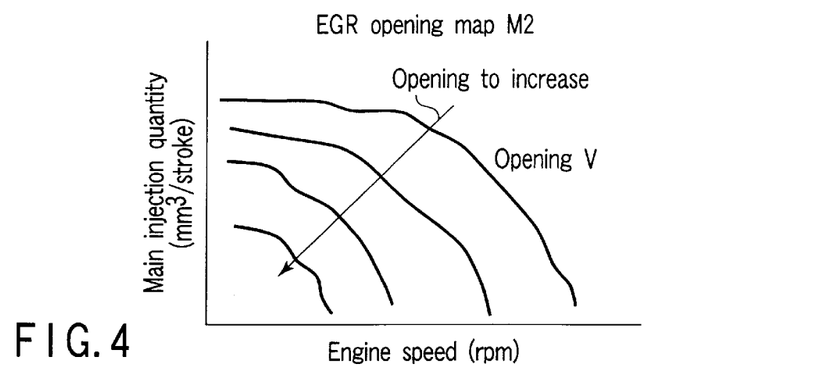
FIG. 4 is a diagram showing a map used to obtain the EGR opening of the exhaust emission control device according to the first embodiment.

If the opening of the EGR valve 23 increases, on the other hand, the reflux quantity of the exhaust gas returned to the intake system 13 increases. As shown in the map M2 of FIG. 4, the opening of the EGR valve 23 is set in accordance with the engine speed and the engine load. The lower the engine speed and the lower the engine load (or the smaller the main injection quantity), for example, the greater the set value of the opening of the EGR valve 23 is. If the reflux quantity of EGR gas increases, the temperature of the engine that reaches the oxidizing catalyst 43 rises.

Thus, the control unit 16 that performs the retard control and the EGR control in Step S2 serves as control means for filter regenerating means according to this invention.

If it is concluded in Step S3 that the active temperature of the oxidizing catalyst 43 is exceeded by the inlet temperature (catalyst temperature) of the catalyst 43, the program advances to Step S5 after the passage of some delay time in Step S4. If it is concluded in Step S3 that the active temperature of the oxidizing catalyst 43 is not exceeded by the inlet temperature of the catalyst 43, the catalyst heat-up process of Step S2 is continued.

In Step S5, the post-injection quantity and the post-injection timing are set as preparations for heating up the filter 44. According to this embodiment, the post-injection implies fuel injection in the expansion or exhaust stroke of the piston 20.

Figure 5:
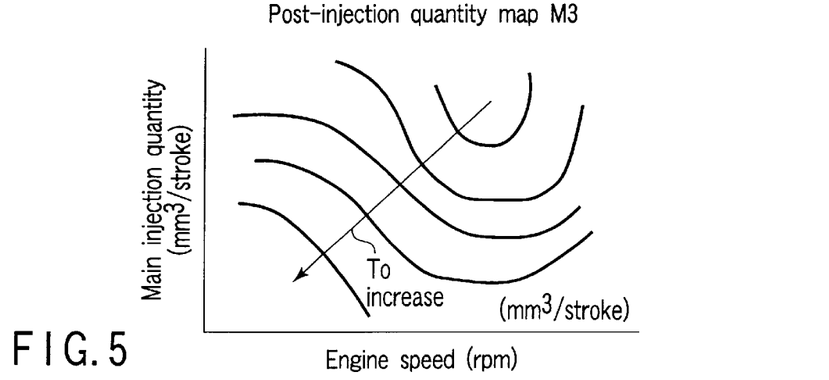
FIG. 5 is a diagram showing a map used to obtain the post-injection quantity of the exhaust emission control device according to the first embodiment.
Figure 6:
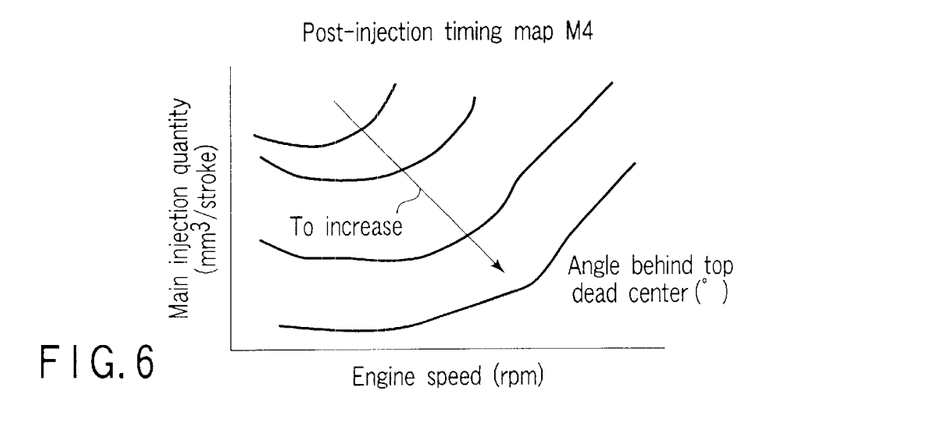
FIG. 6 is a diagram showing a map used to obtain the post-injection timing of the exhaust emission control device according to the first embodiment.

The post-injection quantity is set according to the map M3 of FIG. 5 based on the engine speed and the engine load (main injection quantity). The lower the engine speed and the smaller the main injection quantity, for example, the more the post-injection quantity is increased. Further, the post-injection timing is set according to the map M4 of FIG. 6 based on the engine speed and the engine load (main injection quantity). The higher the engine speed and the smaller the main injection quantity, for example, the greater the set value of the lag angle to the top dead center is.

Thus, in the case of this embodiment, the control unit 16 serves also as control means for the filter regenerating means that controls the fuel injection control means so as to carry out the post-injection.

After Step S5 is executed, the compulsive regeneration is started in Step S6. In this compulsive regeneration, the post-injection is carried out to heat up the filter 44. When this post-injection is achieved, the fuel injected into the combustion chamber 21 in the expansion or exhaust stroke of the engine reaches the oxidizing catalyst 43. This fuel (HC) is oxidized by means of the catalyst 43. The filter 44 is heated up by heat release that is attributable to the oxidation by means of the catalyst 43, and soot is oxidized (burned) directly by $O_2$ on the filter 44 in a temperature range (e.g., 500° C. to 550° C. or more) higher than the range for continuous operation. The fuel (HC) that is not consumed by the oxidizing catalyst 43 adheres to soot on the filter 44, so that combustion is activated further.

Thus, when the post-injection is carried out, the component (HC) to be oxidized by the oxidizing catalyst is supplied to the catalyst. The filter 44 is heated up with heat of oxidation that is produced when this component is oxidized by means of the catalyst, and the soot on the filter 44 is burned and removed, whereupon the filter 44 is regenerated.

In Step S7, the result of detection of the temperature sensor 53 is compared with a target temperature (e.g., 550° C.), the lower limit for the re-combustion of the soot in the particulate filter 44, after the passage of a given period from the start of the compulsive regeneration. The control unit 16 serves also as means for this comparison. Based on the deviation between the detection value and the target temperature, as a result of the comparison, the catalyst heat-up means (Step S2) and/or the particulate filter heat-up means (Step S5) is controlled.

For example, the retard of the main injection or the EGR gas reflux quantity is controlled so that the exhaust gas temperature (detection value of the temperature sensor 53) on the upper-stream side of the filter 44 takes its minimum necessary value for the $O_2$ combustion of soot. Alternatively, the injection quantity and timing for the post-injection are controlled.

Thus, the exhaust gas temperature on the upper-stream side of the filter 44 is adjusted to the minimum necessary value for the $O_2$ combustion, so that the durability and reliability of the filter 44 are improved.

In regenerating the filter 44, according to the exhaust emission control device of the present embodiment, moreover, the oxidizing catalyst 43 can be heated up to its activated state by delaying the injection timing for the main injection or increasing the EGP gas reflux quantity when the temperature of the catalyst 43 is lower than a given temperature, e.g., in a low-load state. Thereafter, the filter 44 is effectively heated up as the component (HC) to be oxidized by the oxidizing catalyst 43 is supplied to the catalyst 43. Accordingly, the soot on the filter 44 is burned and removed, whereupon the filter 44 is regenerated. Thus, the filter 44 can be regenerated without lowering the fuel-efficiency.

According to the embodiment described above, the post-injection is carried out after the given value is exceeded by the temperature of the oxidizing catalyst 43 in the case where the retard control and/or the EGR control for the main injection is performed to heat up the catalyst 43. Alternatively, however, the post-injection may be carried out in a given time after the start of the retard control and/or the EGR control for the main injection is performed to heat up the oxidizing catalyst 43.

The following is a description of an exhaust emission control device of an engine according to a second embodiment of the invention.

Figure 7:
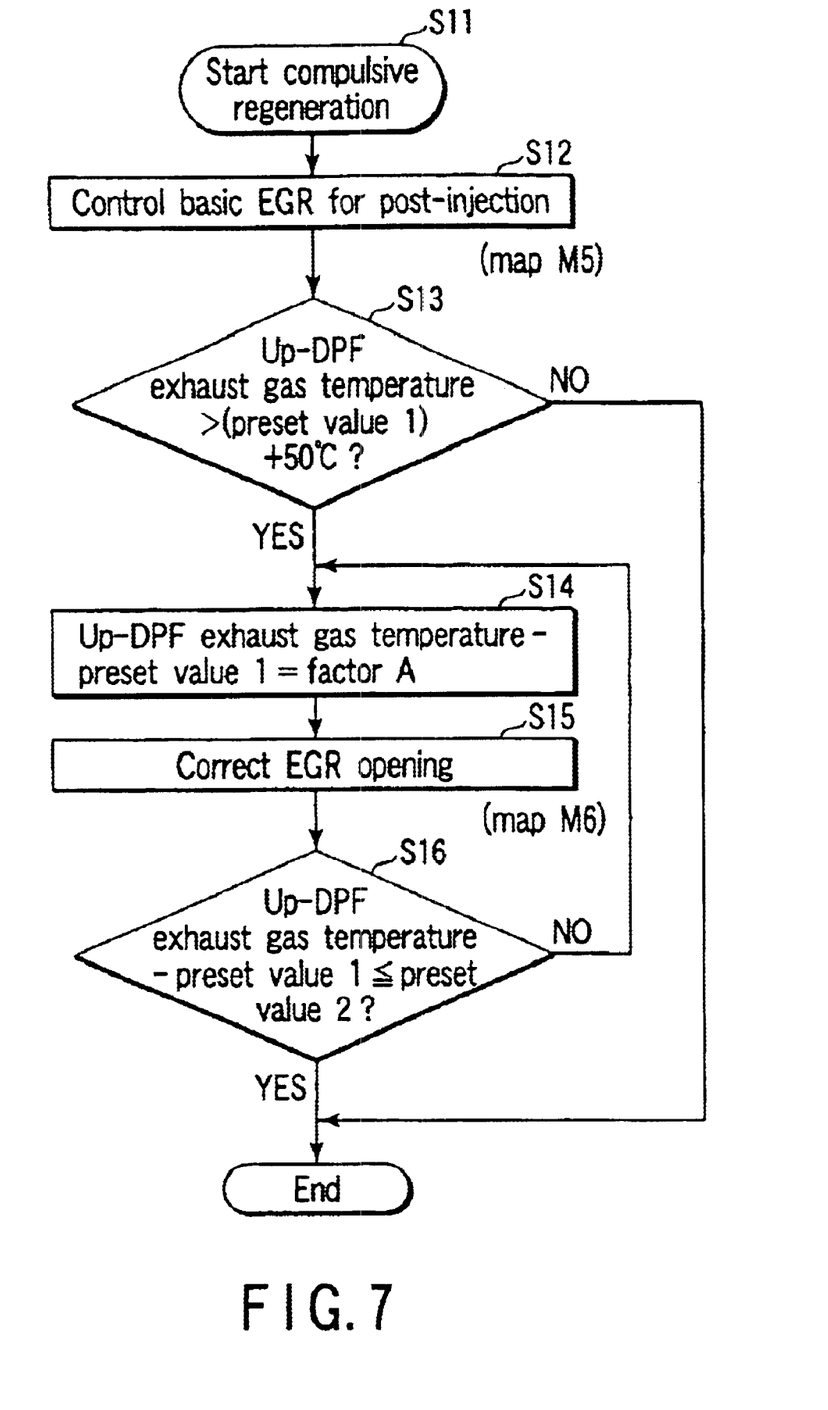
FIG. 7 is a flowchart showing the contents of processing of an exhaust emission control device according to a second embodiment of the invention.

According to this second embodiment, the opening of the EGR valve 23 is controlled by means of EGR control means (control unit 16 and actuator 25) with reference to FIG. 7 as the compulsive regeneration according to the foregoing embodiment is carried out. First, in Step S12, the basic opening of the EGR valve 23 is set with reference to a basic EGR opening map M5 shown in FIG. 8.

This basic opening is an EGR opening such that the HC delivery can be kept at a desired fixed value under an exhaust pressure on the upper-stream side of the filter 44 obtained when about 25 grams of soot is deposited. If the EGR valve 23 is adjusted to this basic opening, the quantity of HC in the exhaust gas on the upper-stream side of the oxidizing catalyst 43 takes a value such that the catalyst 43 cannot produce excessive heat. Thus, the temperature of the catalyst 43 can be kept at about 550° C. that suits $O_2$ combustion.

Figure 8:
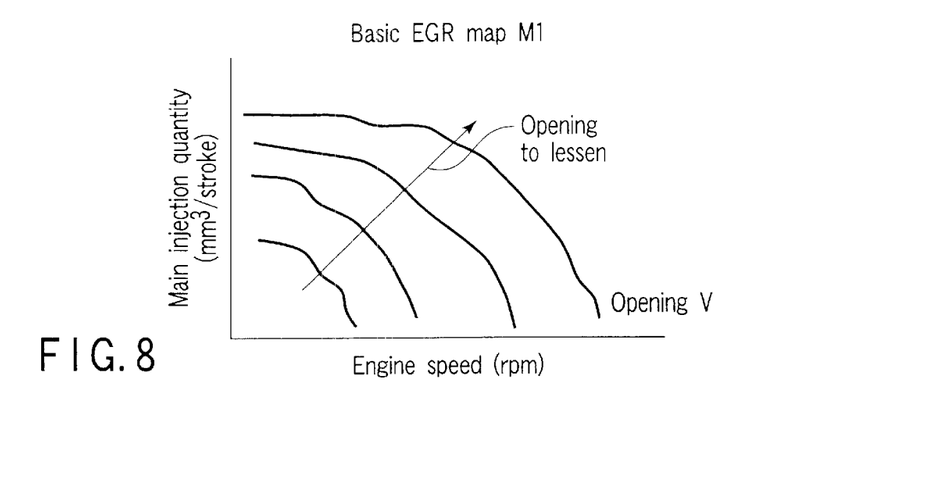
FIG. 8 is a diagram showing a map used to obtain the basic EGR opening of the exhaust emission control device according to the second embodiment.

The control unit 16 controls the actuator 25 so that the opening of the EGR valve 23 is adjusted to the basic opening obtained from the basic EGR opening map M5 shown in FIG. 8. The opening of the EGR valve 23 is controlled so that the higher the engine speed or the greater the injection quantity, the lower the opening is, for example. By this basic opening control, the quantity of THC (thermal hydrocarbon) that reaches the oxidizing catalyst 43 during the post-injection can be kept near a desired value.

Thereafter, the program advances to Step S13, whereupon whether or not the "up-DPF exhaust gas temperature" is higher than "preset value 1+50° C." is determined. The "up-DPF exhaust gas temperature" is a detected temperature of the exhaust gas on the upper-stream side of the filter 44 that is detected by means of the temperature sensor 53. The "preset value 1" is a basic target temperature (e.g., 550° C.) of the exhaust gas on the upper-stream side of the filter 44 obtained when 25 grams of soot is deposited (i.e., during the post-injection).

The "preset value 1+50° C." used in step S13 (comparing means), that is, the exhaust temperature that can be reached by heat-up during the post-injection, is previously set in the control unit 16 that serves as the target exhaust gas temperature setting means. Any constant besides "50° C." may be used depending on the type of the engine.

If it is concluded in Step S13 that the "up-DPF exhaust gas temperature" is higher than "preset value 1+50° C.", the program advances to Step S14.

In Step S14, a deviation "factor A" between the "preset value 1" and the "up-DPF exhaust gas temperature" or the detection temperature of the temperature sensor 53 is calculated.

Figure 9:
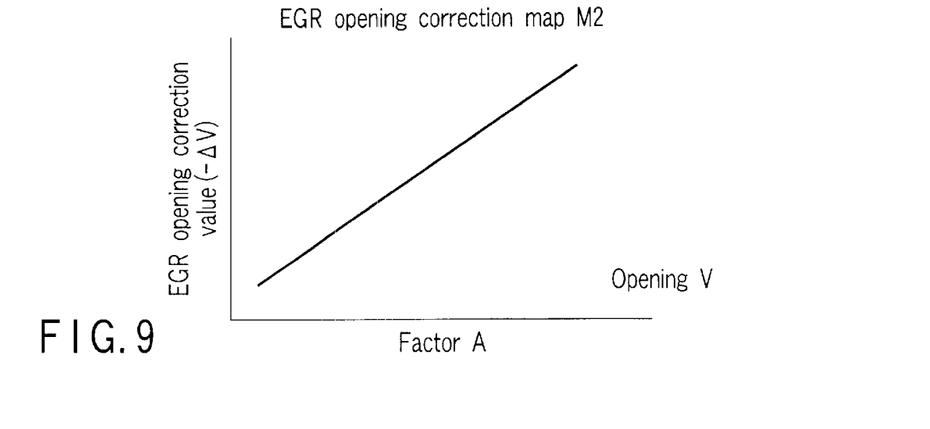
FIG. 9 is a diagram showing a map used to obtain the EGR opening correction value of the exhaust emission control device according to the second embodiment.

In Step S15, an opening correction valve (–ΔV) of the EGR valve 23 is obtained according to the deviation "factor A" that is obtained in Step 514 and an EGR opening correction map M6 shown in FIG. 9, whereby the opening of the EGR valve 23 is corrected. The map M6 is used to obtain the opening correction value (–ΔV) in accordance with the deviation "factor A." The greater the value of deviation "factor A," the greater the opening correction value (–ΔV) of the EGR valve 23 is.

The opening of the EGR valve 23 is corrected with use of the basic EGR opening as a criteria according to the EGR opening correction value (–ΔV) obtained in this manner. If the quantity of EGR gas returned to the intake system 13 is reduced as a result of the EGR opening correction, the quantity of HC in the exhaust gas lessens, so that the quantity of HC in the exhaust gas supplied to the oxidizing catalyst 43 also lessens. Accordingly, the exhaust gas temperature on the upper-stream side of the particulate filter 44 lowers.

After Step S15 is executed, whether or not the difference between the "up-DPF exhaust gas temperature" and the "preset value 1" is not greater than a preset value 2 is determined in Step 516. Although an example of the preset value 2 is 50° C., it may be replaced with any other value. If it is concluded that the difference between the "up-DPF exhaust gas temperature" and the "preset value 1" is not greater than the preset value 2, the EGR opening correction is finished. If it is concluded in Step S16 that the difference between the "up-DPF exhaust gas temperature" and the "preset value 1" is greater than the preset value 2 ("NO"), the EGR opening correction of Steps 514 and S15 is continued.

According to the exhaust emission control device 10 of the embodiment described above, the EGR valve 23 is controlled such that the quantity of HC in the exhaust gas is reduced even if the temperature of the oxidizing catalyst 43 exceeds a given value (e.g., 550° C.). The catalyst temperature may exceed the given value because the opening of the valve 23 becomes greater than the basic opening during the compulsive regeneration from any cause so that the EGR reflux quantity increases or because change of the back pressure causes the EGR reflux increase despite the maintenance of the basic opening level.

Accordingly, extraordinary heat release from the oxidizing catalyst 43 can be restrained, so that the filter 44 that is heated to a high temperature by the $O_2$ combustion during the post-injection can be prevented from being heated to a higher temperature. Thus, the filter 44 can be prevented from melting down.

In the case of the flowchart of FIG. 7, the opening of the EGR valve 23 that is corrected with reference to the map M6 is set simply in accordance with the deviation between the "up-DPF exhaust gas temperature" and the "preset value 1". Preferably, however, retardation such as annealing should be carried out for the EGR opening correction so that the exhaust gas temperature can converge more quickly on the target value (preset value).

It is to be understood, in carrying out the present invention, that the components of the invention, including the specific forms of the filter and the oxidizing catalyst, may be various changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust emission control device of an engine, comprising:
    a particulate filter located in an exhaust passage of the engine for capturing particulates in an exhaust gas;
    an oxidizing catalyst located in the exhaust passage and upstream of the particulate filter;
    fuel injection control means for controlling fuel injection of the engine;
    exhaust gas reflux quantity control means for controlling reflux quantity of the exhaust gas returned to an intake system of the engine;
    temperature detecting means for detecting a temperature indicative of a temperature of the oxidizing catalyst and a temperature indicative of a temperature of an exhaust gas in a vicinity of the particulate filter; and
    filter regenerating means for supplying a component to be oxidized by the oxidizing catalyst to the catalyst, thereby regenerating the particulate filter, the filter regenerating means including,
        catalyst heat-up means adapted to control at least one of the fuel injection control means and the exhaust gas reflux quantity control means, such that the control means at least one of delays the injection timing for a main injection of the fuel injection of the engine and increases the exhaust gas reflux quantity, prior to regeneration of the particulate filter, to heat the oxidizing catalyst when the detected temperature of the oxidizing catalyst is not higher than a first predetermined temperature, and
        feedback controlling means for feedback controlling the exhaust gas reflux quantity control means, during the regeneration of the particulate filter, to correct the reflux quantity based on the detected temperature of the exhaust gas to maintain the obtained temperature within a predetermined range.

2. An exhaust emission control device of an engine according to claim 1, wherein said catalyst heat-up control means sets at least one of a lag angle of the injection timing for the main injection and the increase of the exhaust gas reflux quantity in accordance with an engine speed and an engine load.

3. An exhaust emission control device of an engine according to claim 1, wherein said first predetermined temperature is set to a temperature in which the oxidizing catalyst is active.

4. An exhaust emission control device of an engine according to claim 1, said feedback control means compares the detected temperature of the exhaust gas with a second predetermined temperature set as a temperature at which the particulate filter can be regenerated and, based on the result of the comparison, performs the feedback control on the injection exhaust gas reflux quantity.

5. An exhaust emission control device of an engine according to claim 1, wherein said filter regenerating means further includes, target exhaust gas temperature setting means for setting a target exhaust gas temperature in accordance with an exhaust gas temperature to which the exhaust gas is to be heated, and said control means compares the detected exhaust gas temperature with the target exhaust gas temperature and corrects the exhaust gas reflux quantity, based on a result of the comparison.

6. An exhaust emission control device of an engine according to claim 5, wherein said catalyst eat-up control means carries out a control to at least one of reduce a lag angle of the injection timing for the main injection and reduce the exhaust gas reflux quantity, when the detected temperature indicative of a temperature of the oxidizing catalyst is higher than the target exhaust gas temperature.

7. An exhaust emission control device of an engine according to claim 1, wherein said filter regenerating means includes catch detecting means for detecting a value indicative of an amount of the particulates captured by the particulate filter, and said regenerating process is executed when a given value is exceeded by the detected value.

8. An exhaust emission control device of an engine according to claim 1, wherein said catalyst heat-up control means sets a lag angle of the injection timing for the main injection in accordance with an engine speed and an engine load.

* * * * *